Dec. 18, 1928.  W. D. HARPER  1,695,373
VEHICLE BODY SUPPORT
Filed July 26, 1923   2 Sheets-Sheet 1

INVENTOR
William D. Harper

Dec. 18, 1928.  W. D. HARPER  1,695,373
VEHICLE BODY SUPPORT
Filed July 26, 1923  2 Sheets-Sheet 2
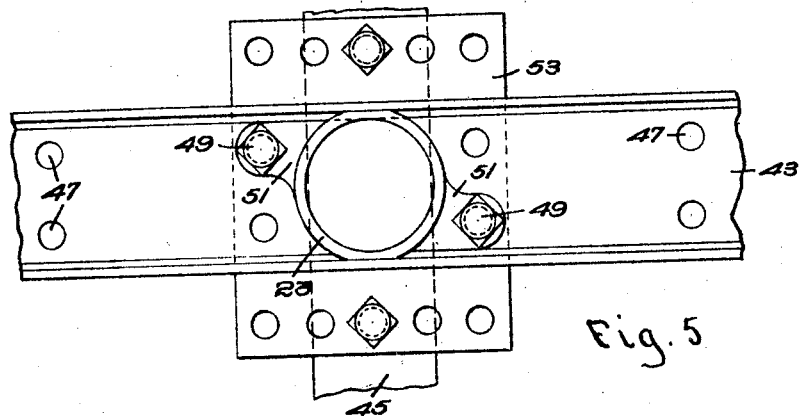
Fig. 5
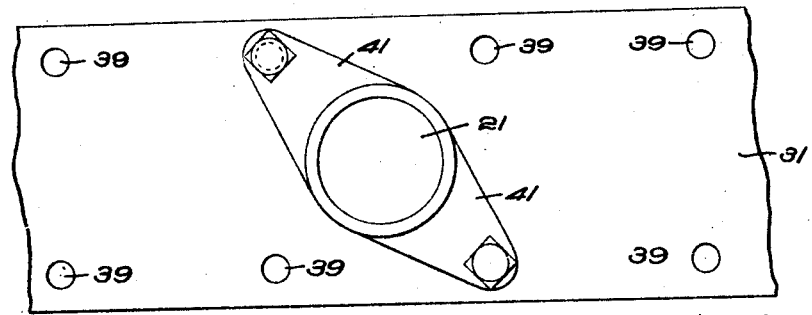
Fig. 6
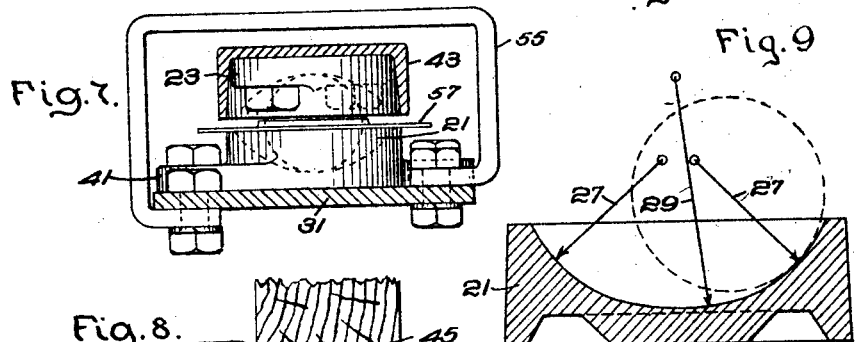
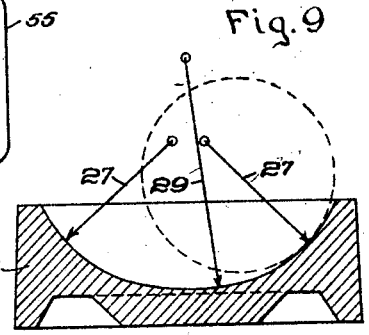
Fig. 9
Fig. 7.
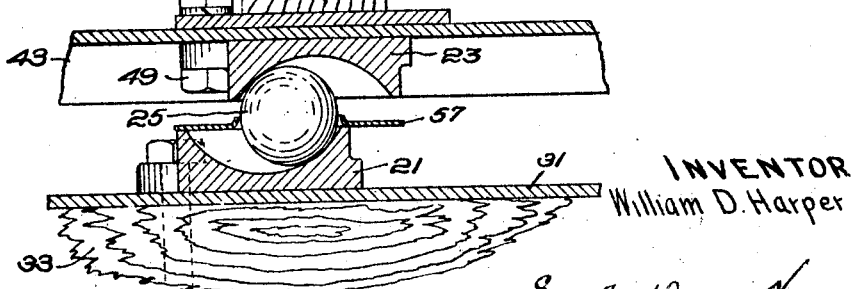
Fig. 8.
INVENTOR
William D. Harper
by Emery Booth Janney Varney
Att'ys Patented Dec. 18, 1928.

1,695,373

UNITED STATES PATENT OFFICE.

WILLIAM D. HARPER, OF WALTHAM, MASSACHUSETTS.

VEHICLE BODY SUPPORT.

Application filed July 26, 1923. Serial No. 653,937.

This invention relates to means for mounting the bodies of automobiles, trailers, or similar vehicles, upon supporting frames, and consists in improvements designed to relieve the body and its load of a substantial portion of the effects of shocks or stresses to which the vehicle may be subjected in ordinary road usage.

The invention will be best understood by reference to the following description, when taken in connection with the accompanying illustration of one specific embodiment thereof, while its scope will be more particularly pointed out in the appended claims.

In the drawings,—

Fig. 5 is a plan view looking from below, showing the parts of a supporting unit which are applied to the vehicle body;

Fig. 6 is a similar plan view showing the parts of a supporting unit which are applied to the chassis or frame;

Fig. 7 is a transverse, sectional elevation taken through the body supporting parts and showing the latter in a normal position of rest, and showing also the strap or stirrup for limiting the movement of the body on the chassis;

Figure 1:
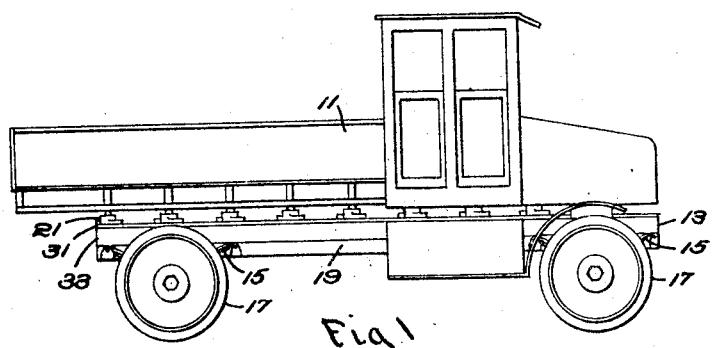
Fig. 1 is a side elevation showing a typical automobile truck having one form of the invention applied thereto.

Fig. 8 is a longitudinal, sectional elevation taken through one of the supporting units and showing the character of movement which takes place when the vehicle body is displaced laterally with relation to the chassis; and Fig. 9 is a sectional elevation taken through the lower cup bearing for one of the supporting units, showing the same on a larger scale and illustrating the variation in curvature of such bearing which provides a progressively increasing lift the further the body departs from the central or normal position of rest.

Referring to the drawings, I have there shown for illustrative purposes the details of one specific embodiment of the invention as applied to an automobile road vehicle,—herein a motor truck,—having the body 11 mounted on the chassis frame 19, the latter being resiliently supported by means of the springs 15 on the wheels 17. The truck is provided with the usual means for self-propulsion (not herein shown), so that the body and the load carried thereby are propelled through a force or draw-bar pull applied through the chassis and from the chassis through the supporting connections hereinafter described.

The body 11 is herein supported upon the chassis frame in such manner that, under lateral displacing forces arising from the momentum or inertia of the body and its load, it may have relatively to the frame a lateral movement compounded with an upward movement. By lateral, in this connection, is meant not only sidewise movement but also forward and rearward movement, or any movement intermediate sidewise and forward or rearward. The purpose of providing such compound movement, as will more fully appear, is to avoid or minimize the effects of shock due to sudden starting, stopping, accelerating or checking the speed of the vehicle, to relieve stresses and strains due to change in direction of the traveling vehicle, and to increase the stability of the loaded vehicle, particularly when the height of the load is comparatively great in proportion to the width of the wheel base.

In the illustrative embodiment of the invention, the body is supported on a chassis frame through the provision of a number of supporting units interposed between the same, which units are shown herein disposed along opposite sides of the chassis frame and carried by the opposite side bars or members 19 of that frame. Each unit herein comprises a bearing support member 21 secured, directly or indirectly, to the chassis frame and a cooperating bearing rest member 23 secured to the body 11, the two members of each unit being located opposite to one another and being so associated as to permit the body-connected bearing member to slide laterally over and on the bearing supporting member either directly, or, as herein, indirectly through the interposition of suitable anti-friction rolling members, the latter comprising the balls 25.

These cooperating bearing parts may be formed and constructed in various ways, but herein a simple form of ball bearing is shown, the intermediate roller member consisting of a spherical bearing ball, while the lower and upper bearing members 21 and 23 respectively are in the form of oppositely disposed upright and inverted cupped shaped races, having corresponding cavities generally spherical in contour but of a radius of curvature greater than the radius of the ball 25, so that, when the body-connected bearing race 23 is moved laterally in any direction from the normal position of rest where the ball 25 seats in the deepest part of the two concavities (see Figs. 2, 3 and 7), the ball rides up the sides of the concavity in the bearing support 21, and the bearing member 23 rides up on the ball, so that, together with the vehicle body, it is given a substantial lifting or rising movement, as illustrated in Fig. 8. The surfaces of these cavities are preferably surfaces of revolution, but if desired for any purposes the rates of curvature in different directions may be different. The concavities may be either truly spherical or may be merely spheroidal in character formed of varying radii of curvature. In the preferred form, as illustrated in Fig. 9, the bearing surface of each cup is formed with a lesser radius of curvature 27 in its outer portions and with a relatively larger radius of curvature 29 in its central portion so that while a smooth, unbroken curved surface is produced, the curvature of the bearing surface of the cup is substantially sharper in those portions remote from the mid position of the ball and towards the edges of the cup than the curvature of the bearing surface at or near the mid position of the ball. Under these conditions the initial displacement of the body takes place readily or with relatively little lift, but the body meets with an increasing check as the ball encounters the more sharply curved portions of the bearing and the lift rapidly increases.

Where a concaved cup is employed I prefer to make the radius of curvature of the outer portions of the bearing surface of the cup, as indicated in Fig. 9 of the drawings, less than the diameter of the ball but greater than the radius thereof. A radius of curvature for the bottom of the cup may then be adopted greater than the diameter of the ball, as indicated in the drawings. This causes a relatively slight lift as the ball first departs from its normal position, the amount of such lift increasing at a moderate rate of acceleration, which latter, however, is sharply accentuated as the ball approaches the outer edges of the cup. I have found that this prevents the ball from unseating by rolling over the edges of the cup, and the lateral movement is not only limited but is checked by the gradual cushioning effect of gravity due to the accentuated lift given the ball just before it reaches the edge of the cup, thus cushioning the body in its extreme lateral movement as distinct from a sudden, short stoppage which would result if the ball were allowed to move laterally against an immovable abutment. Due to the upper and lower bearing cups the lift given the body is multiplied. It is thus possible to secure the advantage of a relatively slight lift in the initial movement of the ball, but when carried to its limit to terminate that lateral movement in a gravity cushioned check due to the aforesaid accentuated lift near the edges. At the same time there are avoided the disadvantages of a shallow cup out of which the ball is likely to roll or of one of large diameter permitting an abnormal lateral movement.

A plurality of supporting units are shown interposed between the body and the chassis, the several units being similar in construction and contour and so located as to have the axial lines of opposing bearing cups in coincidence when the body is in its normal position of rest with respect to the chassis, or the position assumed under gravity, with the bearing ball engaging the deep part of the concavity of each cup, when the chassis is stationary and the wheel base level. Herein there is provided a series of such units on each side of the chassis frame, with the body-connected bearing rests, comprising the inverted cups 23, secured in a rigid and unvarying relation to the underside of the body, and a similar series of opposed, cupped bearing supports 21 secured in rigid and unvarying relation to the top of the chassis frame in alignment and to cooperate with the bearing members 23 and the interposed bearing balls 25. The number and location of the supporting units may be varied within wide limits and may be selected to suit the size and weight of the body and its intended load. A disposition (as illustrated) of two or more (as may be required) of the units lengthwise each side frame member of the chassis gives a desirable and stable distribution of the load. Preferably, though not necessarily, the cavities of the different supporting units are alike in contour and symmetrical in shape so that a given amount of lateral body movement in any direction or of any kind results in an equal lift at all points of body support.

The bearing members of the several supporting units may be secured to the vehicle body and the chassis in a variety of ways, but, in the illustrative embodiment of the invention, I have shown fastening devices which are compact in arrangement and may be constructed in standardized units through means of which vehicles already in service may be readily and simply equipped with the invention.

Referring first to the bearing support members 21, the latter are secured directly to a lower sill plate 31 which extends either continuously or in sections throughout the entire length of the chassis and is bolted to the side bar 19 of the chassis frame through the interposed wooden spacer bar 33 by means of bolts 35, the latter passing through the marginal edges of the sill plate 31 which overlap the sides of the side bar 19, the bolts being secured to a clamping plate 37, which is beneath the side bar 19 and also has overlapping edges. The sill plates 31 and clamping plates 37 may be prepared in standard or stock sizes and lengths to be applicable without fitting work to existing makes of trucks in service. For this purpose they are provided at intervals near opposite marginal edges with equally spaced bolt-receiving holes, such as the holes 39, these being spaced near enough to permit the bolts 35 to be inserted at convenient intervals where they will avoid interference with spring attachments or other obstructions on the chassis frame.

Figure 4:
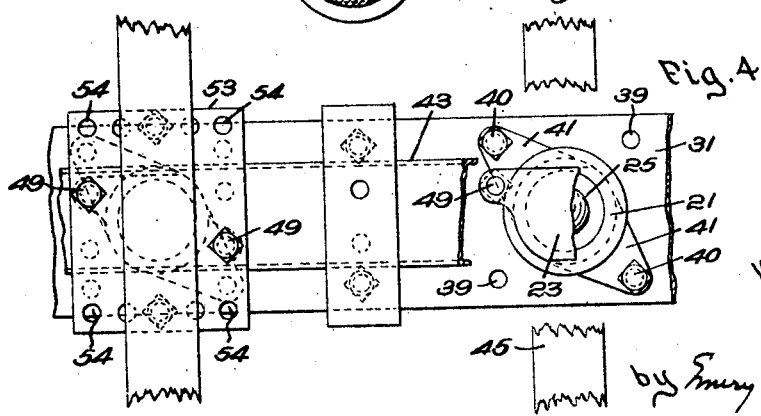
Fig. 4 is a plan view of parts shown in Fig. 2, certain of the body parts being omitted for sake of clearness.

The bearing support or cup 21 for each unit is secured rigidly to the sill plate 31 by means of bolts 40 which pass through feet 41 extending laterally from the bearing member, two diagonally opposite spaced holes 39 being utilized to receive such bolts, as shown in Figs. 4 and 6. By suitably spacing the bolt holes 39, the bearing members may be set on the side frame member at any desired distance apart and other intermediate holes utilized for bolting the sill plate to the chassis frame.

Referring now to the upper cup bearings 23 for the vehicle body, the same are fastened to the underside of the body and in cooperative alignment with the lower raceways by means of sill plates 43 which, for purposes of stiffness and also to securely hold the raceways against displacement, are of channel formation with the channel facing downward. In the illustrative form of truck the channel plates 43 extend longitudinally on each underside of the body across and beneath the transverse floor beams or bolsters 45, so that they not only provide a rigid support for the bearing cups but also stiffen the body itself. If desired, however, channel or other sill plates may be employed extending transversely the body. Herein the body sill plates 43 are provided at opposite sides of the channel with pairs of holes 47 (see Fig. 5) separated at equal intervals similar to the intervals between the holes 39 in the chassis sill plates 31, and the upper bearing races 23 are secured rigidly between the flanged sides of the channels by means of bolts 49 which pass through laterally extending feet 51 provided on the cups, and also through diagonally opposite holes 47 of any adjoining pairs. The bolts 49 also pass through a body plate 53, there being a body plate bolted or otherwise fastened to the underside of each cross beam or bolster 45, so that the channel plate 43 is secured to the successive cross beams or bolsters through the intermediate body plate 53. By this means the successive bearing members on each side of the body are firmly anchored and held between the channel plates 43 and maintained in rigid and unvarying relation lengthwise the body. The body plate 53 is preferably provided with closely spaced bolt-receiving holes 54 along opposite marginal edges to give more or less latitude in applying the same to the body bottom.

Figure 2:
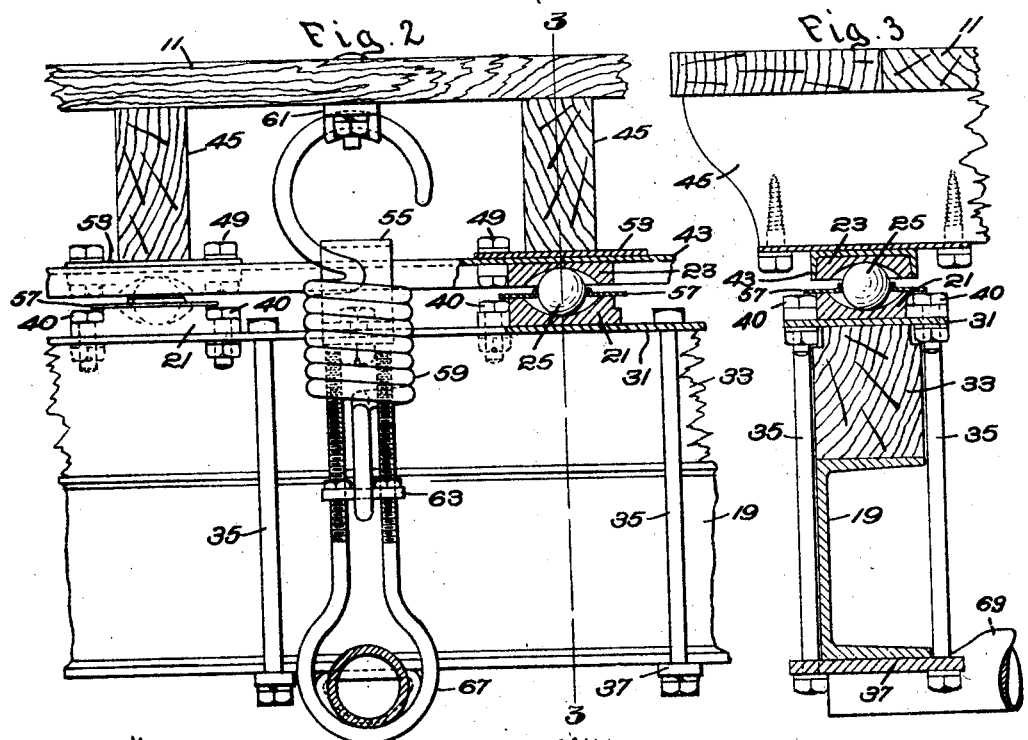
Fig. 2 is a longitudinal elevation, in partial section, upon a larger scale and showing details of the body supporting units and their associated parts.
Figure 3:
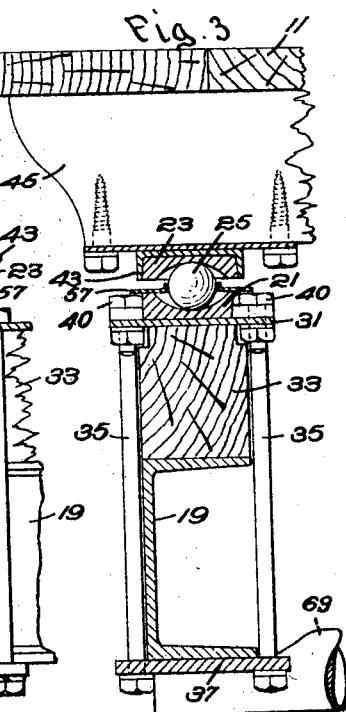
Fig. 3 is a cross section in elevation taken on the line 3—3 in Fig. 2.

When the parts are assembled and the body mounted on the chassis through the series of supporting units described, with the chassis at rest and in a substantially horizontal position, the parts occupy substantially the position shown in Figs. 2, 3 and 7, with the cups in axial alignment and the bearing ball engaging the deepest portion of each concave raceway. When the vehicle is in operation, however, any change in the rate or direction of motion, either in starting from the position of rest or increasing or diminishing the speed or in turning a corner, will tend to move the body and its load laterally under lateral displacing forces arising from the momentum or inertia of the body and its load, but the shocks and stresses consequent on such displacing forces will be checked, absorbed or minimized by the simultaneous lifting movement of the body and its load which is enforced by the lateral movement of the upper raceway on the lower one. The weight of the body and its load, however, tends at all times to bring the parts back to the normal position of rest shown in Figs. 2, 3 and 7, the body settling back to such normal position as soon as the lateral displacing forces cease or diminish.

The amount of the lateral movement and the relative amount of simultaneous lift may be varied to suit different conditions by varying the shape and size of the bearing parts. They will preferably be so shaped as to take care of shocks and stresses met with under ordinary conditions of use. Preferably, however, the supporting connections comprise some means to limit the amount of the lateral and lifting movement so that abnormal shocks or stresses cannot act to unseat or displace the body from the chassis. As a simple means for accomplishing this, I have provided a device to limit the upward movement of the body away from the chassis in the form of a stop member or stirrup 55 (Figs. 2, 4 and 7), consisting of a bar bent into U-shape, the middle part of which passes over the top of the sill plate or channel 43 between two of the transverse floor beams or bolsters 45 with a sufficient clearance in the normal position of rest to allow the necessary lift in the body (see Fig. 7). To prevent further lift, however, the inturned ends of the stirrup 55 are rigidly secured respectively above and below the opposite marginal edges of the chassis sill plate 31 by bolts which pass through opposite marginal perforations in said plate.

One or more of such stirrups, as may be required, are provided on each side of the chassis, so that the rise of the body relative to the chassis is definitely limited by this stop device fixed to the chassis frame.

As a convenient means for excluding the dust or other foreign matter from the lower races or bearing seats 21, suitable means are provided, herein consisting of a dust plate 57, for each bearing ball in the form of a disk centrally perforated so that the same may drop over the ball and rest on the flat face of the race with sufficient overlap to cover the concave surface of the bearing support as the disk moves from side to side with movements of the ball.

It will be seen that the body and its load are so related to the chassis through its supporting connections as to freely respond to such lateral displacing forces as arise from momentum and inertia. Under some conditions of use, as where a truck or vehicle having relatively large capacity is being operated without its load or with a very light load, it may be desirable to check a too-free movement of the body on the chassis. For this purpose I have provided resilient connections between the body and the chassis frame in the form of one or more checking or hold-down springs 59 (Fig. 2) which are relatively light as compared with the weight of the body and its designed load and are simply intended to check the too-free movement of the unloaded body, while having no substantial effect in restraining the combined lateral and lifting movement of the loaded body in the normal conditions of use. One or more of these hold-down springs may be employed and they may be secured at any desired point. Herein the upper end of the spring 59 is secured to a spring hanger 61 fastened to the underside of the floor of the body 11 (see Fig. 2), while the lower end is secured to a strap 63 adjustably fastened to the ends of a threaded U-bolt 65, the eye 67 of the U-bolt passing around a cross bar 69 which is secured to the underside of the chassis frame and extends transversely beneath the side bars thereof.

It will be apparent that when any change in the rate or direction of motion of the chassis occurs, whether in starting from a position of rest, or increasing or diminishing its speed, or in turning a corner, the body, on account of its inertia, will be displaced laterally (within the meaning of that term as previously defined) relatively to the chassis, either lagging behind the chassis when the vehicle is started from a position of rest or its speed is increased, or moving ahead when the speed is checked, or moving more or less to one side when the direction of the vehicle is changed or the wheel base is tilted sidewise or the wheels strike a lateral obstruction or skid. When any such relative motion occurs, the upper cups of the supporting units roll on the balls of such units, and the balls roll on the lower cups. As the cups are concave such lateral movement is accompanied by an upward component of movement, the ball rising toward the side of the lower cup, and the upper cup mounting relatively to the ball. This action is illustrated diagrammatically in Fig. 8. The rise of the ball, and the greater rise of the upper cup at the same time are clearly apparent. It will be apparent, also, that the resultant movement of the upper cup takes place in a curved path which starts horizontally from the position of rest and rises at first slowly and then (due to the varying curvature of the race as illustrated in Fig. 9) with a progressively increasing rise for equal increment of horizontal motion. Such rise of the body is, of course, resisted by gravity, and such resistance becomes greater in increasing ratio with greater lateral displacement, so that the displacement of the body is checked and eventually arrested without shock.

In the illustrative embodiment of the invention no substantial slip occurs between the ball and the cups because the pressure between their contacting surfaces is always exerted in directions more or less nearly radial to the ball and never with a great enough tangential component to cause slip. This result follows because, however great may be the lateral force due to the momentum or inertia of the body, its weight constantly acts vertically with greater force, making the resultant line of pressure between the cups and ball come within the limits above stated.

When the inertia of the body has been overcome, gravity returns it to the position of rest, or approximately to that position depending upon whether the vehicle is in motion or stationary. Thus the body and load are relieved of all sudden shocks and severe stresses when the vehicle starts or stops or encounters obstacles and turns of the road; from which it follows that the conditions of travel are made easier upon all parts of the vehicle, including the driving mechanism, and for the driver and other occupants of the vehicle, and that the stability of the load is increased, particularly when making sharp changes of direction. In the conditions last referred to, the ability of the body to move sidewise relatively to the chassis diminishes the tendency of the vehicle to tip over not only because the incidence of the load on the chassis is applied at the relatively low level where the supporting units are located, but the turning movement, due to centrifugal force acting at the center of gravity of the load, is equally distributed between the supporting units at each side of the truck instead of being concentrated on one side, as is the case where the body is rigidly fastened to the chassis.

Having regard to the ordinary travel conditions, the cups of the supporting units are made of such depth that the balls cannot roll out of them under any conditions short of a disastrous accident; that is, under the most severe conditions likely to be encountered, without otherwise harming the vehicle, the supporting units can be expected to maintain their proper association, and the stop yokes come into action only under exceptional conditions of rough roads and jolting to prevent any such rise of the body as would permit escape of the balls. Owing to the sharply accentuated lift produced when the ball rolls to the outer edges of the cup, the lateral movement will usually be limited and the body brought to rest with the cushioning effect described due to the final accentuated lift of the body on its ball support. The stop yoke is therefore required only where the shock is such as to tend to lift the weight of the body off from any given ball.

By appropriately forming the inner surfaces of the cups, a greater or less rise of the body in a given horizontal distance may be effected, and the rate of increase or rise with equal increments of lateral displacement may be varied. So also may there be a difference between the amount of lateral movement permitted in the forward and rear direction for a given rise, a result which may be accomplished by having the curvature of the cups different in different directions from the center, all within the scope of the invention.

While I have herein shown, as my preferred form, the body bearing members operatively related to the bearing rest on the chassis in each unit through the interposition of a roller bearing in the form of a ball or sphere, any suitable member or members for rolling contact may be provided, or the bearing member of the body may engage directly the bearing rest on the chassis, or there may be interposed between the two any desired form of bearing which affords the desired combined lateral and lifting movement.

In addition to the results accomplished as hereinbefore explained, my invention has the important practical advantage that it can be applied to trucks and other vehicles already in service with the minimum of time, effort and other expense. No modification in the structure of either the chassis or the body is required other than merely the provision of necessary bolt holes in the body floor, while the sill plates and supporting units can be placed between the chassis and the floor of the body and made fast without requiring removal of the body. On account of the construction and design of the sill plates and supporting units, stock parts, previously manufactured in a few standard sizes, are applicable without special fitting to all makes of trucks, and the same essential principles, with suitable modification in detail, are likewise applicable in essentially the same way as herein described to other vehicles than trucks.

I claim:

1. In a road vehicle employing a support and a load-carrying body, a supporting unit permitting movement of the body from its normal position and a consequent lift of the body, said supporting unit comprising a pair of complementary bearing cups, one of which is adapted to be secured to the body and the other to the support, and an interposed ball member arranged to move about therein, said bearing members presenting a smooth, unbroken curved bearing surface of varying sharpness of curvature over which the ball may ride on relative movement of the bearing cups, the radius of curvature of the bearing surface of the cup towards its outer edges being less than the diameter of the ball but greater than the radius thereof and the radius of curvature of the mid portion being greater than the diameter of the ball.

2. In a road vehicle employing a support and a load-carrying body, a supporting unit permitting movement of the body from its normal position and a consequent lift of the body, said supporting unit comprising a pair of complementary bearing members, one of which is adapted to be secured to the body and the other to the support, and an interposed roller member arranged to move about therein, said bearing members presenting a smooth, unbroken curved bearing surface of varying sharpness of curvature over which the roller member may ride on relative movement of the bearing members in any direction, the radius of curvature of the bearing surface of the bearing member towards its outer edges being less than the diameter of the roller member, but greater than the radius thereof.

3. In a road vehicle, the combination with a support through which the vehicle and its load are adapted to be propelled, of a load-carrying body supporting means for the body comprising a plurality of supporting units, each consisting of a pair of complementary bearing members, one of which is secured to the body and the other to the support, and a roller member interposed between said bearing members, one of said bearing members presenting a smooth, unbroken, concaved bearing surface for said roller member, said surface having a relatively large radius of curvature at its mid or bottom portion and a relatively smaller radius of curvature towards its outer edge, whereby there may be enforced a lift of the body incident to said shifting movements and such lifting movement may be sharply accelerated when said roller member comes in contact with the curved portion of lesser radius of curvature.

4. In a road vehicle employing a support and a load-carrying body, a supporting unit permitting movement of the body from its normal position and a consequent lift of the body, said supporting unit comprising a pair of complementary bearing members, one of which is adapted to be secured to the body and the other to the support, and an interposed ball member arranged to move about therein, one of said bearing members presenting a smooth, unbroken curved bearing surface of varying curvature over which the ball may ride on relative movement of the bearing members, the curvature of the bearing surface of the bearing member being sharper away from the mid position of the ball than the curvature of the bearing surface near the mid position thereof.

In testimony whereof, I have signed my name to this specification.

WILLIAM D. HARPER.